Patented Feb. 13, 1940

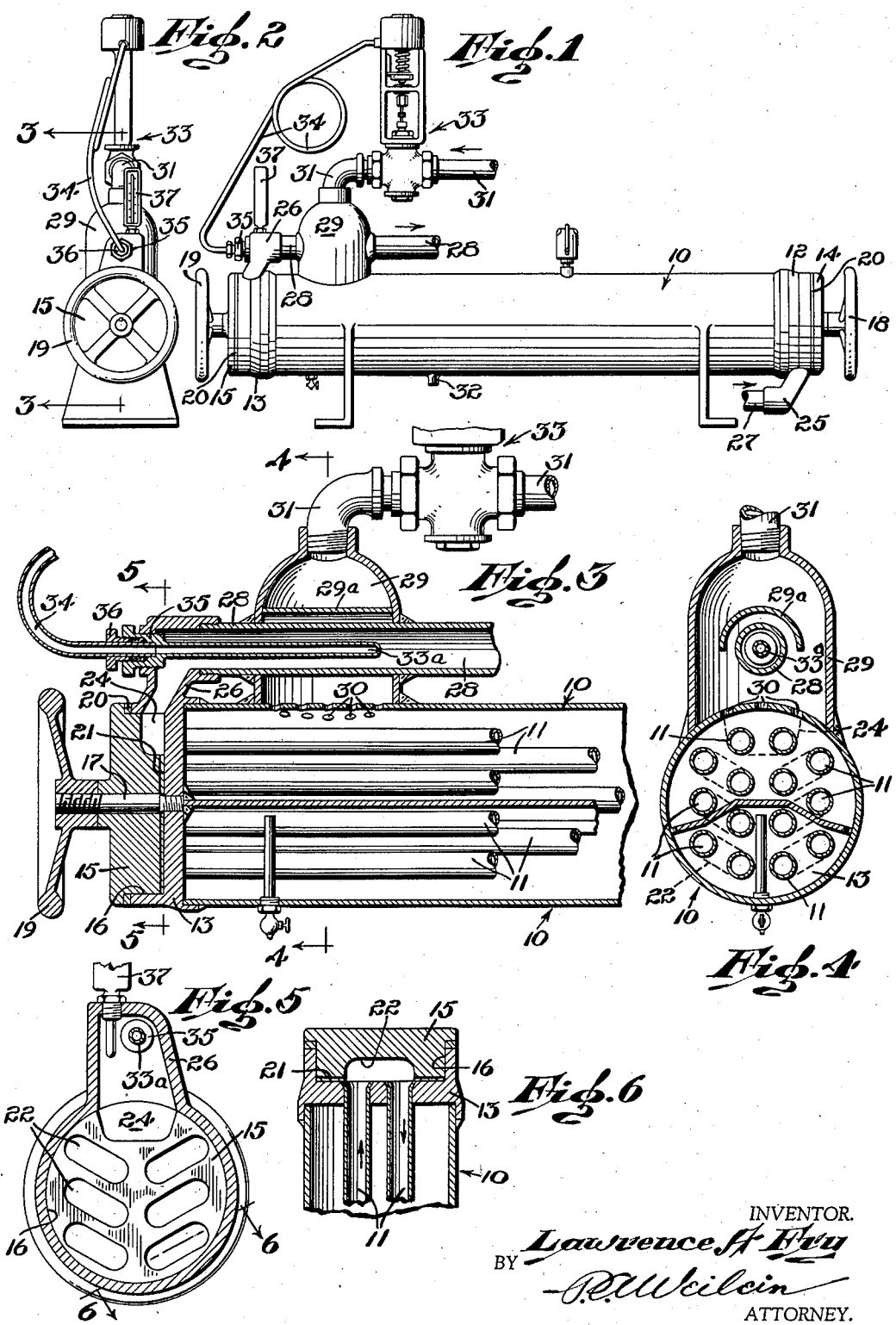

2,190,232

UNITED STATES PATENT OFFICE 2,190,232

TEMPERATURE CONTROL MEANS

Lawrence A. Fry, Los Angeles, Calif., assignor to Bireley's Incorporated, Los Angeles, Calif., a corporation of California Application March 17, 1937, Serial No. 131,399

4 Claims. (Cl. 257—2)

This invention relates to heat exchange apparatus, particularly apparatus for heating or pasteurizing liquids, and to means for positively controlling the temperature of the liquid being treated.

It is an object of the present invention to provide a heating or pasteurizing apparatus in which means is provided for positively and accurately controlling the temperature of the product being treated and preventing the same from becoming overheated.

It is another object of the invention to provide an apparatus of the character referred to in which means is provided for positively preventing the temperature of the liquid from exceeding a predetermined maximum in the event of an interruption in its flow through the apparatus.

Another object of the invention is the provision of a flash pasteurizing apparatus, in which means is provided for preventing an oversupply of heating medium thereto if for any reason the flow of liquid therethrough is interrupted.

Another object of the invention is the provision of a flash pasteurizing apparatus embodying a heating chamber through which liquid is circulated and to which a heating medium is supplied through a valve controlled inlet passage, the valve in said passage being automatically controlled from a temperature responsive means disposed in the path of the flow of liquid within the heating medium.

Still another object of the invention is to convey the liquid from the outlet end of said apparatus through a supplementary heating chamber whose temperature is maintained at least as great as that through which the liquid is circulated, and to provide a thermostatic element in the liquid path within said second chamber, from which the valve in the heating medium inlet passage is controlled.

A further object of the invention is to convey the liquid from the outlet end of the apparatus through a valve controlled inlet passage leading into the apparatus for supplying a heating medium thereto, and to automatically control the operation of said valve from an element disposed in the path of flow of the liquid within the heating medium supply passage.

Other objects of the invention are to provide an apparatus of the character referred to which is positive and accurate in its operation, which is economical to construct and maintain, and which is easy to keep clean.

This invention possesses many other advantages and has other objects which will be made more easily apparent from a consideration of the embodiment thereof shown in the accompanying drawing and forming part of the present specification. I shall now proceed to describe this form in detail, which illustrates the general principles of the invention; but it is to be understood that this description is not to be taken in a limiting sense, since the scope of the invention is best defined in the appended claims.

In the drawing:

Figure 1 is a side elevation of a heating or pasteurizing apparatus embodying my invention.

Figure 2 is an end elevation thereof.

Figure 3 is an enlarged fragmentary sectional view through one end of the apparatus, taken as indicated by line 3—3 of Figure 2.

Figure 4 is a transverse sectional view taken as indicated by line 4—4 of Figure 3.

Figure 5 is a transverse section taken on line 5—5 of Figure 3, and

Figure 6 is a fragmentary section taken on line 6—6 of Figure 5.

For purposes of explanation I have shown my invention in connection with a pasteurizing apparatus in which live steam is used as the heating medium. The apparatus includes a heating chamber in the form of cylinder 10 which encloses a series of tubes 11, and forms a jacket for live steam. The ends of the cylinder 10 are closed by caps 12 and 13 in which the ends of the tubes 11 are supported (Figures 1 and 3). Said tube ends extend through the caps 12 and 13, and are open for convenience in cleaning. The tubes 11 are connected through headers 14 and 15 in such manner as to form a pair of continuous passages through which the product to be heated or pasteurized is adapted to be circulated.

The headers 14 and 15 are contained in cupped portions 16 formed in the caps 12 and 13 as shown clearest in Figures 3 and 6. Said headers are removably clamped against the outer surfaces of the caps where the ends of tubes 11 terminate. The means employed for holding the headers 14 and 15 in clamped relation against the caps 12 and 13, includes stems 17 carried by the caps. The headers 14 and 15 are slidably mounted on said stems and are held in clamped relation against the caps by hand wheels 18 and 19 threaded onto the outer ends of the supporting stems 17. Fluid tight seals in the form of gaskets 20 and 21 are provided between the caps 12 and 13, and the headers 14 and 15.

The tubes 11 are arranged in vertical parallel rows as shown clearest in Figure 4. Their opposite ends are connected through the headers 14 and 15 in such a manner as to form a pair of convoluted passages through the steam jacket for the passage of the product to be treated. The headers 14 and 15 are similarly constructed and are provided with angularly disposed channel-like passages 22 (Figures 4, 5 and 6), the ends of which register with the tubes to be connected. Said headers are invertedly positioned with respect to each other, as shown in Figure 1, so that the inner rows of tubes are connected with the outer rows of tubes (Figure 4), to form the two convoluted passages. One end of the uppermost and lowermost tubes are communicative with chambers 24 formed in the inverted headers 14 and 15, and the caps 12 and 13 are formed with L-shaped conduits 25 and 26, which communicate with the chambers 24, and provide inlet and outlet passages to and from the respective headers 14 and 15.

The liquid to be treated is delivered to the header 14 through the pipe 27 by means of a pump (not shown). From the chamber 24 in the header 14, the liquid passes through the lowermost pair of inner tubes 11 into the header 15, where it is directed into the next higher pair of outer tubes. The liquid passes back into the header 14 through these tubes and is directed into the next higher pair of inner tubes, where it passes back into the header 15. Thus, the liquid continues to pass back and forth through the two separate convoluted passages, and is finally discharged from the uppermost inner tubes, into the chamber 24 of the header 15. From this chamber the liquid passes through the L-shaped outlet conduit 26 into a pipe 28, through which it may be conveyed to any suitable location, as for instance to a measuring and filler apparatus (not shown).

The tubes 11 through which the liquid is circulated, are heated by the application of steam to the cylinder or jacket 10. A supplementary heating chamber 29 is secured to the upper side of the cylinder 10 adjacent the L-shaped discharge conduit 26, and the pipe 28 passes through said chamber. The chamber contains a shield 29a disposed above the pipe 28. Said chamber is rendered communicative with the interior of the cylinder 10 through a series of apertures 30 provided in the cylinder wall (Figures 3 and 4). Steam is delivered to the supplementary chamber 29 through the steam supply pipe 31, and is admitted to the interior of the cylinder 10 through the apertures 30. Although members 10 and 29 have been described as separate heating chambers, in view of their inter-communication through the apertures 30, they may be considered collectively as a single heating chamber with the main heat transfer to the liquid being treated, taking place in the chamber 10, which heating is supplemented by that added in the chamber 29. The steam may be supplied from a suitable source, so that it can be delivered under relatively high pressure to secure the desired temperatures. A steam trap 32 is provided for accommodating the steam condensate (Figure 1).

It is important that the tubes 11 be maintained at such temperature, that the flowing liquid, upon reaching the ends of the convoluted passages formed thereby, is raised to a predetermined temperature. It is of further importance that the temperature of the tubes be accurately controlled so as to prevent the temperature of the liquid being treated from exceeding that temperature required for its pasteurization. Otherwise, certain valuable constituents are destroyed, which results in an inferior product.

In the present instance the temperature of the tubes is automatically controlled in the following manner. An automatic valve 33 of well known type is provided in the steam supply line 31. Said valve is operatively connected with a hollow thermostatic bulb 33a through a fluid column contained in the interconnecting tube 34. The thermostatic bulb 33a is supported from the L-shaped discharge conduit 26, and extends into that portion of pipe 28 contained in the supplementary steam jacket 29. Said thermostatic bulb is provided with an enlarged threaded end 35 by which it is threadedly secured to the conduit 26. One end of the interconnecting fluid tube 34 enters said enlarged portion and communicates with the interior of the thermostatic bulb 33a. Said enlarged portion also contains suitable packing, acted upon by a packing gland 36, for preventing a leakage of the operating fluid within the bulb 33a and tube 34.

In operation it will be obvious how the temperature within the intercommunicative steam heating chambers or jackets 10 and 29 will be substantially the same in the region of the perforations 30. It will further be obvious how the temperature of the fluid in the outlet ends of uppermost tubes 11 and that portion of the pipe 28 contained within the supplementary steam jacket 29 will also be substantially the same. The temperature of the liquid when passing through the enclosed portion of the pipe 28, is maintained substantially the same as the maximum temperature of the liquid upon reaching the ends of the convoluted passages formed by the tubes 11. The operation of the thermostatic bulb 33a is immediately responsive to any slight variations in the temperature of the liquid as it reaches the end of its path of travel through the heating tubes. Accordingly if the temperature of the liquid at any time exceeds the maximum required temperature, the automatic valve is immediately closed to temporarily cut off any further supply of steam. A thermometer 37 extends through the outlet conduit 26 into the liquid passage, for recording the temperature of the liquid as it leaves the outlet ends of the convoluted heating passages.

The automatic valve may be adjusted to close when the liquids reach a predetermined temperature. However, if for any reason the flow of the liquid is interrupted before said liquid reaches a sufficient temperature to cause the valve to close, it will be obvious how steam will continue to pass through the supplementary heating chamber into the main heating chamber, thereby raising the temperature of the heating tubes. However, by passing the pipe 28 through the supplementary steam jacket in the path of the steam inlet, and positioning the thermostatic bulb so that it extends into that portion of the pipe enclosed by said steam jacket, it will be obvious how the valve will be closed and the steam cut off before the temperature within the cylinder or jacket 10 becomes sufficient to overheat the tubes 11 and the liquid contained therein.

I claim:

1. A pasteurizing apparatus comprising a main heating chamber, a supplementary heating chamber mounted externally on said main heating chamber and communicating therewith, means forming a passageway through which fluid is adapted to be conducted, said passageway passing through said main heating chamber and having an outlet passing through said supplementary heating chamber, means for supplying heat to said supplementary chamber from where it may pass into said main heating chamber, said heat means passing through said supplementary heating chamber transversely to the direction of fluid flow through said outlet, means for regulating the flow of heat to said supplementary chamber, and means responsive to the temperature of the fluid in said outlet within the supplementary heating chamber for controlling said regulating means.

2. A heat exchanging apparatus comprising means forming a heating chamber having an end closure, means for supplying heat to said heating chamber, means forming a passageway through which fluid is adapted to be conducted, said passageway including a plurality of tubes passing through said end closure and further including a header having channels therein for providing communication between ends of adjacent tubes in said closure, an outlet conduit integral with said closure and communicating with said header, means for conducting fluid from said outlet conduit, and means carried by said outlet conduit and being adapted to respond to fluid temperature in said last mentioned means for controlling the flow of heat to said chamber.

3. A heat exchanging apparatus comprising means forming a heating chamber having an end closure, means for supplying heat to said heating chamber, means forming a passageway through which fluid is adapted to be conducted, said passageway including a plurality of tubes passing through said end closure and further including a header having channels therein for providing communication between ends of adjacent tubes in said closure, an outlet conduit integral with said closure and communicating with said header, means for conducting fluid from said outlet conduit, means carried by said outlet conduit and being adapted to respond to fluid temperature in said last mentioned means for controlling the flow of heat to said chamber, a single stud passing through said header and having one end attached to said end closure, and means attached to the other end of said stud for clamping said header in fixed position with respect to said end closure.

4. A pasteurizing apparatus, comprising means forming a heating chamber, means forming a passageway through which fluid to be treated is adapted to be conducted, said passageway passing through said chamber and having an outlet passage leading therefrom, means for supplying heat to the fluid in the passageway in said chamber, said means having an inlet enclosing a portion of said outlet passage whereby the fluid passing through the outlet passage will be at its maximum temperature, baffle means positioned in said heat supplying means in advance of the enclosed portion of said outlet passage, means for regulating the supply of heat to said heating chamber, and means responsive to the temperature of the fluid in that portion of the outlet passage enclosed by the heat supplying means for controlling said regulating means.

LAWRENCE A. FRY.